(12) United States Patent
Woodland et al.

(10) Patent No.: US 9,151,863 B2
(45) Date of Patent: Oct. 6, 2015

(54) METHOD AND APPARATUS FOR A METAL DETECTION SYSTEM

(75) Inventors: Peter Robert Woodland, Frankston (AU); Spencer Sherwood, Melbourne (AU); John Andrew Whittingham, Frankston (AU)

(73) Assignee: Goldwing Design & Construction Pty Ltd., Frankston (AU)

(*) Notice: Subject to any disclaimer, the term of this patent is extended or adjusted under 35 U.S.C. 154(b) by 0 days.

(21) Appl. No.: 13/819,350

(22) PCT Filed: Aug. 29, 2011

(86) PCT No.: PCT/AU2011/001114
§ 371 (c)(1),
(2), (4) Date: Feb. 27, 2013

(87) PCT Pub. No.: WO2012/027783
PCT Pub. Date: Mar. 8, 2012

(65) Prior Publication Data
US 2013/0163650 A1   Jun. 27, 2013

(30) Foreign Application Priority Data

Aug. 29, 2010 (AU) .............................. 2010100945
Dec. 17, 2010 (AU) .............................. 2010101425

(51) Int. Cl.
*H04L 5/16* (2006.01)
*G01V 3/10* (2006.01)
*H04L 7/00* (2006.01)

(52) U.S. Cl.
CPC .............. *G01V 3/104* (2013.01); *H04L 7/0008* (2013.01)

(58) Field of Classification Search
CPC ...... H04B 1/38; H04B 1/3805; H04B 1/3822; H04B 1/385; H04B 1/7183; H04L 7/0008; H04L 7/0012; H04L 7/0054; H04J 3/0685
USPC .......................... 375/219–220, 354, 356, 358
See application file for complete search history.

(56) References Cited

U.S. PATENT DOCUMENTS

| | | | | |
|---|---|---|---|---|
| 4,540,943 | A * | 9/1985 | Akers | 324/326 |
| 4,821,023 | A * | 4/1989 | Parks | 340/551 |
| 5,377,227 | A * | 12/1994 | Hurlbut et al. | 375/142 |
| 5,506,506 | A | 4/1996 | Candy | |
| 5,537,041 | A * | 7/1996 | Candy | 324/329 |
| 5,576,624 | A * | 11/1996 | Candy | 324/329 |
| 5,583,435 | A * | 12/1996 | Takemoto et al. | 324/207.17 |
| 5,629,626 | A * | 5/1997 | Russell et al. | 324/345 |
| 5,751,773 | A * | 5/1998 | Campana, Jr. | 375/346 |
| 6,347,120 | B1 * | 2/2002 | Sakoda | 375/259 |
| 6,362,625 | B1 * | 3/2002 | Wiegert | 324/329 |
| 6,636,044 | B2 * | 10/2003 | Candy | 324/336 |

(Continued)

*Primary Examiner* — Emmanuel Bayard
(74) *Attorney, Agent, or Firm* — Sutherland Asbill & Brennan LLP (57) ABSTRACT

The present application relates to the field of metal detectors, which may find military, industrial and civilian application. In one form, the present application relates to a method and apparatus for a metal detection system in which a first component is synchronized with a second component. The metal detection system is adapted for use in diminishing interference between two or more metal detectors operating in close proximity. In one form, the metal detection system is adapted for use in a ground loop metal detection system that allows for the detection of metal or metallic objects at greater depths than currently available with standard pulse induction or induction type metal detecting equipment.

17 Claims, 5 Drawing Sheets

(56) References Cited

U.S. PATENT DOCUMENTS

| | | | |
|---|---|---|---|
| 6,781,380 B1* | 8/2004 | Wiegert | 324/329 |
| 6,927,577 B2* | 8/2005 | Nelson | 324/329 |
| 6,967,574 B1* | 11/2005 | Nelson | 340/551 |
| 7,132,943 B2* | 11/2006 | Nelson | 340/551 |
| 7,310,586 B2 | 12/2007 | Stamatescu et al. | 702/107 |
| 7,629,790 B2* | 12/2009 | Stolarczyk et al. | 324/330 |
| 7,710,118 B2* | 5/2010 | Emery | 324/326 |
| 7,759,941 B2* | 7/2010 | Bosnar | 324/337 |
| 8,174,429 B2* | 5/2012 | Steinway et al. | 342/22 |
| 8,249,752 B2* | 8/2012 | Suzuki | 700/283 |
| 8,264,348 B2* | 9/2012 | Dinh | 340/540 |
| 8,427,163 B2* | 4/2013 | Sickler, Jr. | 324/329 |
| 8,786,277 B2* | 7/2014 | Webb et al. | 324/246 |
| 8,842,035 B2* | 9/2014 | Duvoisin et al. | 342/22 |
| 2002/0014985 A1* | 2/2002 | Wurman et al. | 342/26 |
| 2003/0012259 A1* | 1/2003 | Callaway et al. | 375/140 |
| 2003/0034778 A1* | 2/2003 | Nelson | 324/329 |
| 2003/0052684 A1* | 3/2003 | Nelson et al. | 324/329 |
| 2003/0193430 A1* | 10/2003 | Gresham et al. | 342/70 |
| 2003/0201894 A1* | 10/2003 | Li | 340/573.1 |
| 2004/0114631 A1* | 6/2004 | Aiken et al. | 370/503 |
| 2004/0196175 A1* | 10/2004 | Matsuoka | 342/118 |
| 2005/0072236 A1* | 4/2005 | Heyman et al. | 73/602 |
| 2005/0110496 A1* | 5/2005 | Siegel et al. | 324/329 |
| 2005/0176377 A1* | 8/2005 | Shoji et al. | 455/68 |
| 2005/0207519 A1* | 9/2005 | Phang et al. | 375/354 |
| 2005/0237186 A1* | 10/2005 | Fisher et al. | 340/539.22 |
| 2005/0253711 A1* | 11/2005 | Nelson | 340/552 |
| 2006/0088338 A1* | 4/2006 | Matsuda et al. | 399/167 |
| 2006/0128503 A1* | 6/2006 | Savarese et al. | 473/353 |
| 2007/0058038 A1* | 3/2007 | David et al. | 348/135 |
| 2007/0069864 A1* | 3/2007 | Bae et al. | 340/10.2 |
| 2008/0008044 A1* | 1/2008 | Patterson et al. | 367/128 |
| 2008/0048905 A1* | 2/2008 | McEwan | 342/21 |
| 2008/0100498 A1* | 5/2008 | Fullerton et al. | 342/21 |
| 2008/0186168 A1* | 8/2008 | Di Saverio | 340/540 |
| 2008/0261183 A1* | 10/2008 | Donaldson | 434/185 |
| 2008/0273636 A1* | 11/2008 | Zhu et al. | 375/345 |
| 2008/0279287 A1* | 11/2008 | Asahina | 375/242 |
| 2009/0101823 A1* | 4/2009 | Jez et al. | 250/341.1 |
| 2009/0135046 A1* | 5/2009 | Steele et al. | 342/27 |
| 2009/0209219 A1* | 8/2009 | Akahori | 455/234.1 |
| 2009/0254260 A1* | 10/2009 | Nix et al. | 701/96 |
| 2009/0268787 A1* | 10/2009 | Cairns et al. | 375/148 |
| 2010/0001872 A1* | 1/2010 | Lian et al. | 340/661 |
| 2010/0019924 A1* | 1/2010 | D'Alessandro et al. | 340/825.36 |
| 2010/0045422 A1* | 2/2010 | Teng et al. | 340/3.1 |
| 2010/0082168 A1* | 4/2010 | Suzuki | 700/283 |
| 2010/0134158 A1* | 6/2010 | Pignol et al. | 327/156 |
| 2010/0135363 A1* | 6/2010 | Qin et al. | 375/147 |
| 2010/0148960 A1* | 6/2010 | Candy | 340/540 |
| 2010/0204575 A1* | 8/2010 | Roche et al. | 600/437 |
| 2010/0303184 A1* | 12/2010 | Komori | 375/354 |
| 2011/0015804 A1* | 1/2011 | Cluff et al. | 701/1 |
| 2011/0025498 A1* | 2/2011 | Dinh | 340/540 |
| 2011/0032794 A1* | 2/2011 | Rhodes et al. | 367/15 |
| 2014/0122958 A1* | 5/2014 | Greenebrg et al. | 714/748 |

* cited by examiner

METHOD AND APPARATUS FOR A METAL DETECTION SYSTEM

RELATED APPLICATIONS

This application claims priority to Australian Innovation Patent No. 2010100945 in the name of Peter Woodland, which was filed on 29 Aug. 2010, entitled "GPS Synchronised Metal Detector" and the specification thereof is incorporated herein by reference in its entirety and for all purposes. This application also claims priority to Australian Innovation Patent No. 2010101425 in the name of Peter Woodland, which was filed on 17 Dec. 2010, entitled "Metal Detector Ground Loop" and the specification thereof is incorporated herein by reference in its entirety and for all purposes.

FIELD OF INVENTION

The present invention relates to the field of metal detectors, which may find military, industrial and civilian application. In one form, the present invention relates to a method and apparatus for a metal detection system in which a first component is synchronised with a second component. It will be convenient to hereinafter describe the invention in relation to its use in diminishing interference between two or more metal detectors operating in close proximity, however it should be appreciated that the present invention is not limited to that use, only.

BACKGROUND ART

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain prior or related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

A metal detector in its simplest form may comprise an oscillating electrical supply producing an alternating current that passes through a coil, which in turn emanates an alternating magnetic field that is used to interrogate a physical region of space into which the alternating magnetic field emanates. If a piece of electrically conductive metal is proximate the coil, eddy currents are induced in the metal by the alternating magnetic field and this produces an alternating magnetic field of its own. The coil, or in some forms a second coil, of the metal detector may then measure this magnetic field emanating from the metal object by way of acting as a magnetometer. Accordingly, the change in the recorded magnetic field due to the metallic object can be detected.

The modern development of the metal detector began in the 1920s where an employee of Federal Telegraph Company in California, Gerhard Fisher, had developed a system of radio direction-finding, which was to be used for accurate navigation. The system worked extremely well, but Fisher noticed that there were anomalies in areas where the terrain contained ore-bearing rocks. He reasoned that if a radio beam could be distorted by metal, then it should be possible to design a machine which would detect metal using a search coil adapted for resonating at a radio frequency. In 1925 he applied for, and was granted, what was considered the first patent for a metal detector[1]. However, during the early years of World War II, Lieutenant Jozef Stanislaw Kosacki, a Polish officer attached to a unit stationed in St Andrews, Fife, Scotland, refined the design into a practical detector that became known as the Polish mine detector[2]. These early military metal detectors were heavy, ran on vacuum tubes, and needed separate battery packs.

[1]http://en.wikipedia.org/wiki/Metal_detector#Industrial_metal_detectors
[2]Tadeusz Modelski (1986). The Polish Contribution to The Ultimate Allied Victory in The Second World War. Worthing, England. p. 221

Pursuant to the early developments of metal detectors, the most notable being the Polish mine detector, the first industrial metal detectors were developed in the 1960s and these found extensive use for mining and other industrial applications. Typical uses included de-mining (the detection of land mines), the detection of weapons such as knives and guns particularly in airport security, geophysical prospecting, archaeology and treasure hunting for hobbyists. In some industrial applications, metal detectors are also used to detect foreign bodies in food, and, as a further example, in the construction industry to detect steel reinforcing bars in concrete and for detecting pipes and wires buried in walls and floors.

Metal detectors have since been developed to provide greater sensitivity, lower noise and greater depth penetration by exploiting the characteristic electrical properties of materials, for example gold or iron, that differentiate them from the materials they may be situated in and, also by exploiting electrical signal properties, for example by way of synchronous mains rejection and so on. Examples of such developments are disclosed in U.S. Pat. No. 5,506,606 in the name of Candy and in Australian Innovation Patent No. 2010101019 in the name of Rockey. However, neither of these prior art references or any other prior or related art disclosures known to the inventor address the following problems with metal detectors.

Figure 1:
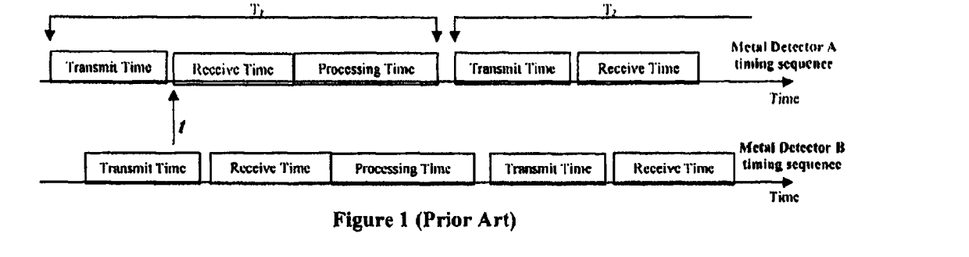
FIG. 1 illustrates the relative timing cycles of two conventional metal detectors of the prior art which comprise transmit and receive periods that are characteristic to each individual detector and are unrelated or uncorrelated to the other.
Figure 3:
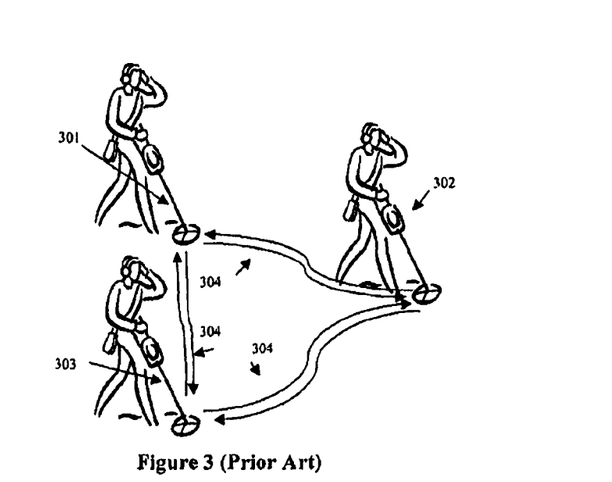
FIG. 3 illustrates three separate conventional metal detectors of the prior art in use showing interference between respective detectors due to having disparate timing cycles as illustrated in FIG. 1.

A metal detector cannot be operated in close proximity with another metal detector because the electro-magnetic field generated from each unit will inevitably produce interference effects with the signal(s) received by the receiver circuitry of other metal detectors in range of the generated electro-magnetic field. By way of explanation, a metal detector cannot be operated in close proximity with other metal detectors because the transmit and receive timing circuitry of the individual metal detectors will be operating at relatively different positions in given timing cycles for respective detectors. For example, FIG. 3 shows three separate metal detectors 301, 302 and 303 each with their own coil operation controlled by circuitry within each respective detector. In other words the transmit/receive timing of individual metal detectors 301, 302 & 303 is unaligned. Taking any two detectors out of detectors 301, 302 or 303 and designating these two example detectors as A and B, with reference to FIG. 1, in the timing sequences shown, at time t, metal detector A has finished transmitting and has started to receive within its timing cycle $T_1$. However, metal detector B is still transmitting at time t in its own characteristic timing cycle. Given that metal detector B is still transmitting whilst metal detector A is entering a period of receiving, metal detector B's transmitted signal will cause interference to the received signal of metal detector A. This disruptive overlap of transmit and receive timing within each respective cycle of the detectors is illustrated in FIG. 3 where the transmit signal 304 from each detector's interrogating coil is more or less simultaneously received by each of the other detectors operating within close proximity.

Another problem identified by the inventor with metal detectors is that the depth of detection offered by a metal detector is limited by the size of the search or primary coil that produces the interrogating magnetic field. Large search coils detect deeper than smaller search coils and therefore a straightforward solution to the problem of providing greater depth or penetration for a metal detector is to use a larger search coil. However, large search coils have their own deficiencies for use in that, for example, with portable field use metal detectors having large search coils they are difficult to use in long grass or in between objects like trees because of their size. There is also the drawback that stationary (non-portable) metal detectors, for example, those for industrial use will require much greater space to occupy because of the required size increase to accommodate larger coils.

SUMMARY OF INVENTION

It is an object of the embodiments described herein to overcome or alleviate at least one of the above noted drawbacks of prior or related art systems or to at least provide a useful alternative to prior or related art systems.

In a first aspect of embodiments described herein there is provided a method of operating a metal detection system comprising at least one metal detector and a communication interface, the method comprising the steps of:
synchronising at least one first metal detector system component with at least one second metal detector system component.

The communication interface may comprise an electromagnetic signal interface as is known in communication arts. Accordingly, the communication interface may be any one or a combination of satellite, radio, Infra Red, optical, wire or cable communication interfaces.

The step of synchronising may comprise the following steps in turn:
generating a synchronising pulse signal;
transmitting the synchronising pulse signal over the communication interface;
receiving the synchronising pulse signal at the first metal detector system component;
resetting the timing sequence of at least one of a transmit timing signal and a receive timing signal of the first metal detector system component in accordance with the synchronising pulse signal.

In accordance with a first preferred embodiment, the steps of generating and transmitting a synchronising pulse signal are invoked by a communication device remote to the first and second metal detector system components wherein the remote communication device may comprise a GPS satellite. The synchronising pulse signal may accordingly comprise a resultant PPS signal adapted to synchronise to Universal Time and is generated by a GPS receiver in one or a combination of the first and second metal detector system components. Furthermore, in an alternate embodiment there is provided the step of introducing a steering signal adapted to lock a timing oscillator of one or a combination of the first and second metal detector system components to an exact frequency.

Preferably, where a remote device is utilised for invoking the generating and transmitting of a synchronising pulse signal, the step of receiving the synchronising pulse signal is performed by one or more of the first and second metal detector system components acting as a slave device.

In another embodiment, it is preferable that the steps of generating and transmitting a synchronising pulse signal are performed by the second metal detector system component acting as a master device. In this form the step of receiving the synchronising pulse signal may be performed by the first metal detector system component acting as a slave device.

Preferably, the communication interface comprises one or a combination of:
a satellite communication interface;
a radio interface;
a wireless Infra Red link;
a wire or cable link;
an optical fibre link.

The first metal detector system component may comprise a first metal detector transmit/receive timing circuit and the second metal detector system component may comprises a second metal detector transmit/receive timing circuit. Alternatively, in another embodiment, the first metal detector system component comprises a ground loop coil.

In another aspect of embodiments described herein there is provided a method of operating a first metal detector in close proximity with a second metal detector comprising the steps of:
synchronising a transmit/receive timing circuit of the first metal detector with a transmit/receive timing circuit of the second metal detector. In this embodiment the step of synchronising comprises:
generating a synchronising pulse signal;
transmitting the synchronising pulse signal over a communication interface;
receiving the synchronising pulse signal at the first metal detector;
resetting the timing sequence of at least one of a transmit timing signal and a receive timing signal of the first metal detector in accordance with the synchronising pulse signal.

In still another aspect of embodiments described herein there is provided a method of increasing the detection depth of at least one metal detector comprising the steps of:
synchronising a transmit/receive timing circuit of the at least one metal detector with a transmit/receive timing circuit of at least one ground loop coil. In this embodiment the step of synchronising comprises:
generating a synchronising pulse signal;
transmitting the synchronising pulse signal over a communication interface;
receiving the synchronising pulse signal at a control device of the ground loop coil;
resetting the timing sequence of at least one of a transmit timing signal and a receive timing signal of the ground loop coil in accordance with the synchronising pulse signal.

The ground loop system preferably uses common metal detector technology to be incorporated into a larger coil or coils loop driver energizing system that by being coupled to receivers and transmitters allows the synchronisation from the transmitter of a metal detector to couple and energise via associated electronic means a ground loop coil or coils.

In yet another aspect of embodiments described herein there is provided a metal detection system comprising:
at least one metal detector;
a communication interface;
synchronising means for synchronising at least one first metal detector system component with at least one second metal detector system component.

Preferably, the metal detection system further comprises:

synchronising pulse signal means for generating a synchronising pulse signal;

transmission means for transmitting the synchronising pulse signal over the communication interface;

receiving means for receiving the synchronising pulse signal at the first metal detector system component;

resetting means for resetting the timing sequence of at least one of a transmit timing signal and a receive timing signal of the first metal detector system component in accordance with the synchronising pulse signal.

In a preferred form the metal detection system described above further comprises a remote communication device adapted to invoke the synchronising pulse signal means to generate the synchronising pulse signal and the transmission means to transmit the synchronising pulse signal over the communication interface.

The remote communication device may comprise a GPS satellite. Furthermore, in one preferred form the synchronising pulse signal comprises a resultant PPS signal adapted to synchronise to Universal Time and is generated by a GPS receiver in one or a combination of the first and second metal detector system components. In one further embodiment the receiving means is adapted to introduce a steering signal adapted to lock a timing oscillator of one or a combination of the first and second metal detector system components to an exact frequency.

Preferably one or more of the first and second metal detector system components is adapted to receive the synchronising pulse signal by acting as a slave device.

In another preferred form the second metal detector system component, acting as a master device, is adapted to generate and transmit the synchronising pulse signal. In this preferred form, the first metal detector system component, acting as a slave device, may be adapted to receive the synchronising pulse signal.

The system in preferred forms may comprise an arrangement wherein the communication interface comprises one or a combination of:

a satellite communication interface;
a radio interface;
a wireless Infra Red link;
a wire or cable link;
an optical fibre link.

In yet a further aspect of embodiments described herein there is provided a metal detection system adapted for operating a first metal detector in close proximity with a second metal detector comprising:

synchronising means for synchronising a transmit/receive timing circuit of the first metal detector with a transmit/receive timing circuit of the second metal detector. The synchronising means may comprise:

synchronising pulse signal means for generating a synchronising pulse signal;

transmitting means for transmitting the synchronising pulse signal over a communication interface;

receiving means for receiving the synchronising pulse signal at the first metal detector; and resetting means for resetting the timing sequence of at least one of a transmit timing signal and a receive timing signal of the first metal detector in accordance with the synchronising pulse signal.

In still another aspect of embodiments described herein there is provided a metal detection system adapted to increase the detection depth of at least one metal detector comprising:

synchronising means for synchronising a transmit/receive timing circuit of the at least one metal detector with a transmit/receive timing circuit of at least one ground loop coil. Preferably, the synchronising means comprises:

synchronising pulse signal means for generating a synchronising pulse signal;

transmitting means for transmitting the synchronising pulse signal over a communication interface;

receiving means for receiving the synchronising pulse signal at a control device of the ground loop coil;

resetting means for resetting the timing sequence of at least one of a transmit timing signal and a receive timing signal of the ground loop coil in accordance with the synchronising pulse signal.

In the above described metal detection systems the communication interface may comprise one or a combination of:

a satellite communication interface;
a radio interface;
a wireless Infra Red link;
a wire or cable link;
an optical fibre link.

Certain embodiments of the present invention are also envisaged by apparatus adapted to synchronise at least one first metal detector system component with at least one second metal detector system component, said apparatus comprising:

processor means adapted to operate in accordance with a predetermined instruction set, said apparatus, in conjunction with said instruction set, being adapted to perform the method steps as described herein.

Further particular embodiments of the present invention are envisaged in a computer program product comprising:

a computer usable medium having computer readable program code and computer readable system code embodied on said medium for synchronising at least one first metal detector system component with at least one second metal detector system component within a data processing system, said computer program product comprising:

computer readable code within said computer usable medium for displaying performing the method steps as described herein.

Other aspects and preferred forms are disclosed in the specification and/or defined in the appended claims, forming a part of the description of the invention.

In essence, embodiments of the present invention stem from the realization that coupling one or more metal detector system components for operative control of the transmit/receive timing circuits of each component in synchronisation can enhance or even amplify the capability of a metal detector.

Advantages provided by the present invention comprise the following:

In the aspects of the present invention involving synchronisation, for example, using GPS timing, drift and interference (which may be caused by some detectors transmitting while others are receiving at the same time) may be avoided. The synchronisation may be carried out, for example, by way of use of wireless or cable communication.

Two or more metal detectors can be used in close proximity with each other. This will allow a group of operators to cover a large amount of ground in less time without covering the same area.

An advantage provided by the aspect of the present invention that involves a ground loop is that deeper penetration into the ground for detection may be provided by virtue of the resultant larger and/or stronger fields generated. In this respect, non-military applications may be envisaged such as, detection of ore bodies underground. As coil sizes for a metal detector are limited, this aspect of embodiments of the invention may be helpful. In preferred embodiments the connection for expanded operation of a metal detector via a ground loop may be established by way of cable or even wireless link from user to control box. This aspect is notably able to provide deeper detection depth. Accordingly, a ground loop metal detection system is provided that allows for the detection of metal or metallic objects at greater depths than currently available with standard pulse induction or induction type metal detecting equipment.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present invention may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Synchronization of Metal Detectors for Close Proximate Operation

In accordance with first, second and third embodiments of the present invention, a metal detector or plurality of metal detectors incorporate one or a combination of techniques to synchronize together the metal detectors' timing circuits, for example the transmit and or receive timing signals of respective metal detectors, so as to diminish or eliminate interference between respective detectors and allow operation of multiple detectors in close proximity to each other. Accordingly, and by way of example with respect to portable metal detectors operated by personnel to inspect for metals in and about ground, this will allow a group of operators to cover a large amount of ground in less time and also without overlap in which one or more detectors could otherwise cover the same area. These first, second and third embodiments comprise utilising signal communication by way of GPS (Global Positioning System), wireless radio link, wireless Infra Red link, optical fibre cable, and wired or cable connection in order to synchronise the operation of two or more metal detectors and allow the metal detectors to operate in close proximity with each other. It is also envisaged within the scope of embodiments of the present invention to utilise one or a combination of these various means of signal communication to achieve the desired synchronisation between metal detectors.

Figure 2:
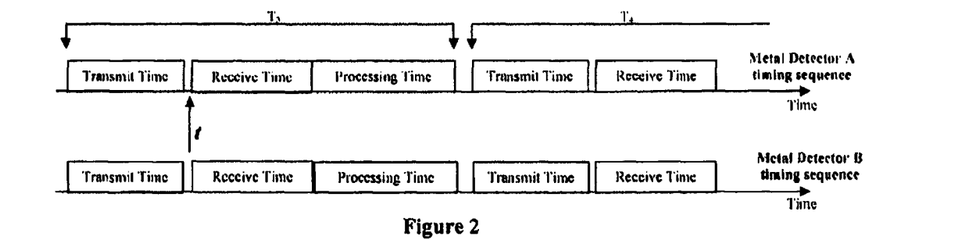
FIG. 2 illustrates relative timing cycles of two metal detectors in which the respective transmit and receive periods of the two detectors are synchronised in accordance with preferred embodiments of the present invention.

To illustrate the effect of the first, second and third embodiments of the present invention, FIG. 2 shows that any two given metal detectors A and B are transmitting and receiving at the same time because there timing sequence has been synchronized together. Accordingly, little if any interference is produced between metal detector A and metal detector B due to the operation of either detector.

As will be appreciated by the person skilled in the art, whilst the exemplary systems of first, second and third embodiments described herein illustrate operation of three individual metal detectors, the synchronising described herein is applicable to any number of individual metal detectors to the extent that a plurality of metal detectors may operate in close or "overlapping" proximity to other individual metal detectors.

Figure 4:
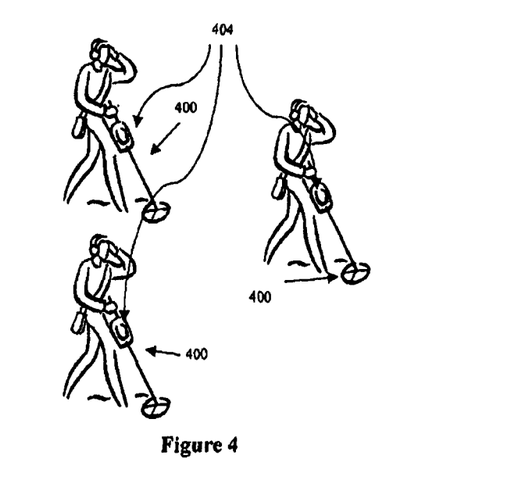
FIG. 4 illustrates three separate metal detectors in use in accordance with a first embodiment of the present invention.
Figure 5A:
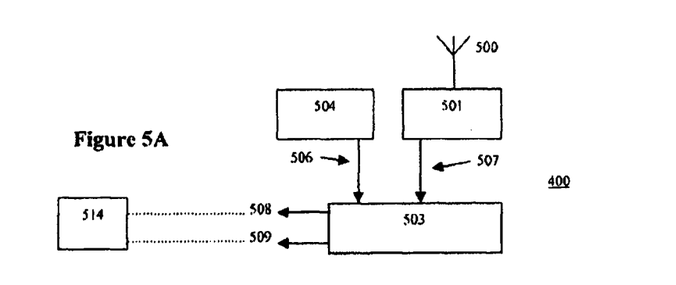
FIGS. 5A and 5B are block system diagrams showing two alternate configurations, respectively, comprising timing oscillator and detector timing circuits of a metal detector in accordance with the first embodiment of the present invention.
Figure 5B:
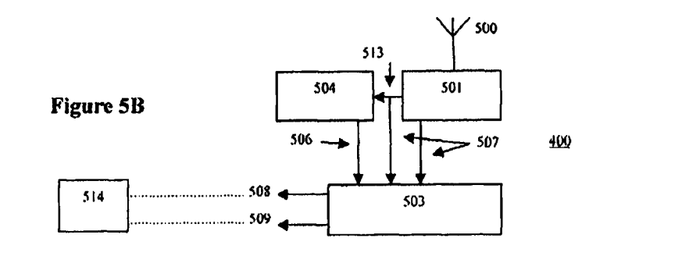

In a first aspect, further reference is now made to FIGS. 4, 5A and 5B as well as FIG. 2, where according to a first embodiment of the present invention, three metal detectors 400 as shown in FIG. 4 are operating in synchronisation to prevent mutual interference. FIG. 4 shows three separate metal detectors 400 each with their own coil operation controlled by circuitry within each respective detector that is synchronized by use of a GPS reference signal 404. The basic block diagrams of FIGS. 5A and 5B show, inter alia, the timing circuits 503 for a GPS synchronized metal detector 400 being any one of the three detectors shown in FIG. 4. As FIGS. 5A and 5B detail, a GPS receiver 501 is incorporated into a metal detector 400 to allow for accurate synchronization of timing of the transmitter and receiver circuitry through the metal detector timing circuit 503. Locking in of the timing of receive and transmit functions of one or more metal detectors 400 will allow many metal detectors 400 to operate in close proximity as not to cause interference to each other.

The GPS receiver 501 generates a synchronising pulse signal in the form of a PPS (Pulse Per Second) signal 507. The PPS signal 507 has a rising edge aligned with the GPS time referenced second, and can be used to discipline local clocks/oscillators to maintain synchronization with Universal Time (UT). The timing circuits 503 generate a transmit timing signal 508 and a receive timing signal 509 from a timing oscillator 504, which are used to operate the metal detector's coils 514 in the transmission of an interrogating field and the detection of a return magnetic field emanating from a region of interest in response to the interrogating field transmission. The timing oscillator 504 cannot be the exact same frequency or phase as any other timing oscillator 504 in another metal detector 400, as the individual timing oscillators 504 will drift with time and or temperature as would be appreciated by the person skilled in the art. However, advantageously the PPS signal 507 from the GPS receiver 501 resets the timing sequence of the metal detector 400 once every second or any multiple numbers of seconds. This will keep a given metal detector's 400 transmit and receive timing in sequence with another metal detector 400 with the same said synchronising being performed. With respect to the action of resetting the timing sequence, in the context of the present description and disclosure herein, the term "reset" is to be taken in its normal meaning in the arts of electronics and or digital computing. For example, in terms of resetting a timing circuit any means within the understanding of the person skilled in the art may be utilised to change a setting within the relevant timing circuit to bring it to an initial state. In preferred embodiments of the present invention, having the timing circuits of one or more detection system components change to their respective initial state effectively simultaneously in this manner brings about the synchronisation sought.

In an alternate form of the first embodiment, FIG. 5B shows a basic block diagram comprising a GPS receiver 501 that has a timing oscillator steering signal 513 as well as the PPS signal 507. The steering signal 513 is used to lock the timing oscillator 504 to an exact frequency, so that the metal detector 400 timing sequence will not drift as much as in the embodiment of FIG. 5A. The metal detector 400 may now only require a timing sequence reset once every minute or any multiple numbers of minutes as opposed to shorter periods of time for the embodiment of FIG. 5A, as would be understood by the person skilled in the art.

Figure 6:
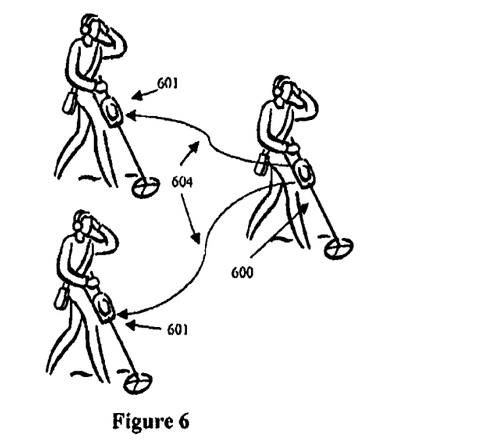
FIG. 6 illustrates three separate metal detectors in use in accordance with a second embodiment of the present invention.

In a second embodiment of the present invention, FIG. 6 shows a wireless link, for example either radio or Infra Red link, used in a metal detector synchronized system in which three example metal detectors 600, 601 are shown. One of the metal detectors will be configured as a master 600 and all other metal detectors configured as slaves 601. The master metal detector 600 transmits a synchronising pulse signal 604 which all the slaves 601 receive.

Figure 7A:
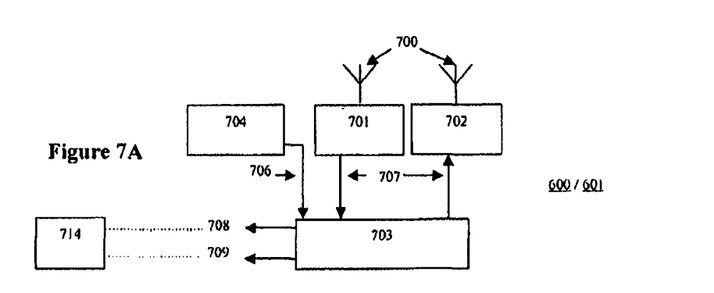
FIGS. 7A and 7B are block system diagrams showing two alternate configurations, respectively, comprising timing oscillator and detector timing circuits of a metal detector in accordance with the second embodiment of the present invention.

FIG. 7A shows a basic block diagram comprising the timing circuits 703 for a wireless radio link synchronized metal detector being configurable as either a master metal detector 600 or a slave metal detector 601. The timing circuits 703 generate a transmit timing signal 708 and a receive timing signal 709 from a timing oscillator 704 to control the transmission or reception operation of the metal detector coils 714 in much the same manner as described with reference to FIGS. 5A and 5B. The timing oscillator 704 cannot be the exact same frequency or phase as any other timing oscillator 704 in another metal detector 600 or 601, as they will drift with time and or temperature as would be appreciated by the person skilled in the art. The synchronising pulse signal transmitted by wireless radio link from antenna 700 of a master metal detector 600 is received on the corresponding antenna 700 of slave metal detectors 601 which resets the timing sequence of the slave metal detectors 601 at a predetermined periodic rate of the master metal detector 600. This will keep the transmit and receive timing of any metal detectors 600, 601 of the system of proximate detectors in sequence with the other metal detectors in the system with the same said synchronising.

Alternatively, the system of detectors shown in FIG. 6 may use an Infra Red link to carry a controlling signal 604 to slave metal detectors 601 from a master metal detector 600 in order to provide a synchronized system. As described above, one of the metal detectors will be configured as a master 600 and all other metal detectors configured as slaves 601. The master metal detector 600 transmits a synchronising pulse signal 604 which all the slaves receive.

Figure 7B:
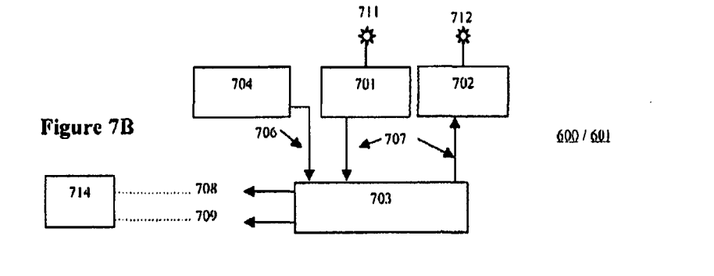

FIG. 7B shows a basic block diagram comprising the timing circuits 703 for an Infra Red link synchronized metal detector being configurable as either a master metal detector 600 or a slave metal detector 601. The timing circuits 703 generate a transmit timing signal 708 and a receive timing signal 709 from a timing oscillator 704 to control the transmission or reception operation of the metal detector coils 714 in much the same manner as described with reference to FIG. 7A. The timing circuits 703 generate transmit and receive timing signals 708 and 709, respectively from a timing oscillator 704. The timing oscillator 704 cannot be the exact same frequency or phase as any other timing oscillator 704 in another metal detector 600, 601, as they will drift with time and or temperature as would be appreciated by the person skilled in the art. The synchronising pulse signal 604 transmitted by Infra Red Link from the master metal detector 600 is received on the slaves 601 and this resets the timing sequence of the metal detectors 601 at a periodic rate. This will keep the transmit and receive timing of each metal detectors 600/601 in sequence with the other metal detectors 600/601.

Figure 8:
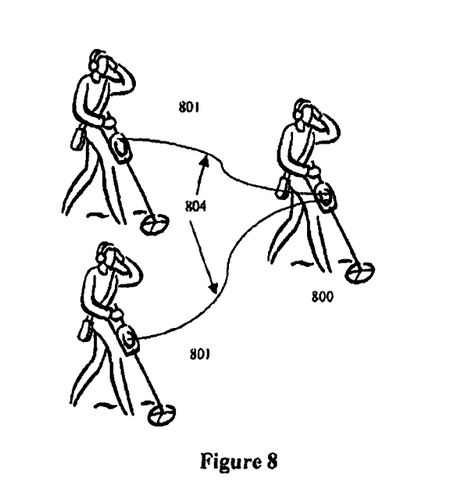
FIG. 8 illustrates three separate metal detectors in use in accordance with a third embodiment of the present invention.

In accordance with a third embodiment of the present invention, FIG. 8 shows a cable link, for example either a wire cable or optical fibre cable link, that is used in a metal detector synchronized system in which three example metal detectors 800, 801 are shown. One of the metal detectors will be configured as a master 800 and all other metal detectors configured as slaves 801. The master metal detector 800 transmits a synchronising pulse signal 804 which all the slaves 801 receive.

Figure 9A:
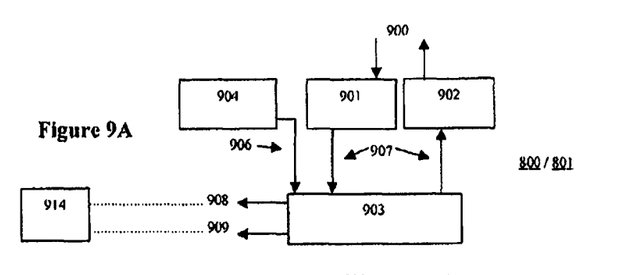
FIGS. 9A and 9B are block system diagrams showing two alternate configurations, respectively, comprising timing oscillator and detector timing circuits of a metal detector in accordance with the third embodiment of the present invention.

FIG. 9A shows a basic block diagram comprising the timing circuits 903 for a wire cable link synchronized metal detector being configurable as either a master metal detector 800 or a slave metal detector 801. The timing circuits 903 generate a transmit timing signal 908 and a receive timing signal 909 from a timing oscillator 904 to control the transmission or reception operation of the metal detector coils 914 in much the same manner as described with reference to FIGS. 5A, 5B, 7A and 7B. The timing oscillator 904 cannot be the exact same frequency or phase as any other timing oscillator 904 in another metal detector 800 or 801, as they will drift with time and or temperature as would be appreciated by the person skilled in the art. The synchronising pulse signal transmitted by wire cable link from cable port or cable connector 900 of a master metal detector 800 is received on the corresponding cable port or connector 900 of one or more slave metal detectors 801 which resets the timing sequence of the slave metal detectors 801 at a predetermined periodic rate of the master metal detector 800. This will keep the transmit and receive timing of any metal detectors 800, 801 of the system in sequence with the other metal detectors in the system.

Alternatively, the system of detectors shown in FIG. 8 may use an optical fibre link to carry a controlling signal 804 to slave metal detectors 801 from a master metal detector 800 in order to provide a synchronized system. As described above, one of the metal detectors will be configured as a master 800 and all other metal detectors configured as slaves 801. The master metal detector 800 transmits a synchronising pulse signal 804 which all the slaves receive over the optical fibre link cable.

Figure 9B:
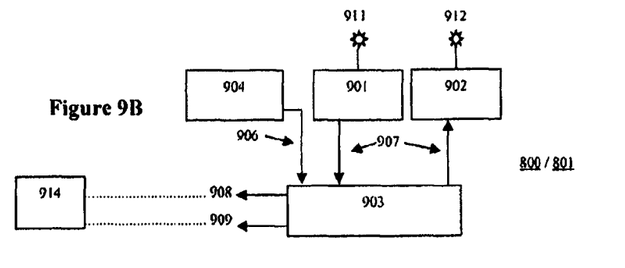

FIG. 9B shows a basic block diagram comprising the timing circuits 903 for an optical fibre link synchronized metal detector being configurable as either a slave metal detector 801 or a master metal detector 800 by virtue of having both optical fibre receiver 901/911 and optical fibre transmitter 902/912. The timing circuits 903 generate transmit and receive timing signals 908 and 909, respectively from a timing oscillator 904. The timing oscillator 904 cannot be the exact same frequency or phase as any other timing oscillator 904 in another metal detector 800, 801, as they will drift with time and/or temperature as would be appreciated by the person skilled in the art. The synchronising pulse signal 804 transmitted by optical fibre Link 912 from the master metal detector 800 is received on the slaves 801 and this resets the timing sequence of the metal detectors 801 at a periodic rate. This will keep the transmit and receive timing of each metal detectors 600/601 in sequence with the other metal detectors 800/801.

Figure 10:
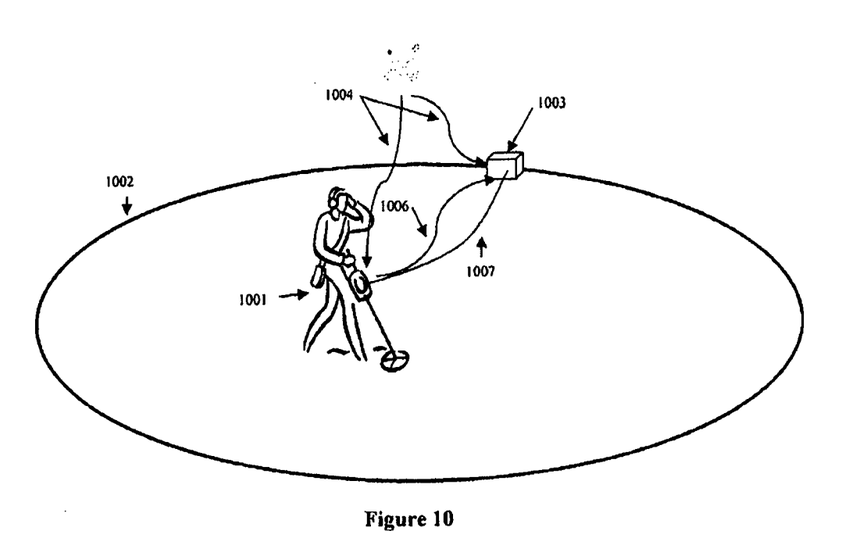
FIG. 10 illustrates a metal detector system in use in accordance with a fourth embodiment of the present invention.

Synchronisation of a Metal Detector(s) with a Ground Loop Controller for Increased Detection Depth With reference to FIG. 10 and in accordance with a fourth embodiment of the present invention a metal detection system comprising at least one metal detector incorporates one or a combination of techniques to synchronize together the metal detector(s) timing circuits. For example the transmit and or receive timing signals of a respective metal detector, with the operation of a ground loop that is operatively associated with the metal detector(s) so as to allow for the detection of metal or metallic objects at greater depths than currently available with pulse induction or induction type metal detecting equipment. Accordingly, and by way of example with respect to portable metal detectors operated by personnel to inspect for metals in and about ground, this will allow a single or a group of operating metal detectors to penetrate to greater depths than the one or more detectors operating alone could otherwise achieve. The fourth embodiment comprises utilising signal communication by way of GPS (Global Positioning System), wireless radio link, wireless Infra Red link, optical fibre cable, and wired or cable connection in order to synchronise the operation of one or more metal detectors with a ground loop or loops and allow one or more metal detectors to operate at extended depth to a normal operational capability of a metal detector per se. It is also envisaged within the scope of embodiments of the present invention to utilise one or a combination of these various means of signal communication to achieve the desired synchronisation between metals detector(s) and ground loop(s).

As shown in FIG. 10 a ground loop system may comprise a coil loop 1002, and equally, multiple loops that can be placed on or near to the ground. The loop 1002 or loops are connected to a control device 1003 comprising one or a combination of a power supply, transmit and receive circuitry, and an electronically controlled switched energising system for the loop 1002. The energising system controls the amount of and for the duration of the energy being coupled into the coil loop(s) 1002. The energizing system of the control device 1003 may be controlled by the receiver that is adapted for receiving control signals from a separate or remote transmitter that is in turn being controlled from a separate metal detector device, for example. In preferred embodiments an existing pulse or induction type metal detecting apparatus 1001 such as for example commonly available metal detectors may be utilised in this manner. A receiver and transmitter are coupled to the metal detector unit 1001. The receiver intercepts the transmitted, information from the metal detector coil or transmitter electronics and this information is then transmitted to the receiver coupled to energising transmitter system of the ground loop coil 1002 or coils.

In more detailed description and with further detailed reference to FIG. 10, the ground loop metal detection system of the fourth embodiment comprises a control box with battery 1003, a ground loop 1002 or loops and a metal detector 1001 that can synchronize the ground loop control box 1003 transmitter. The synchronising pulse signal can be from GPS (global positioning system) satellites, for example GPS signal 1004 depicted in FIG. 10. Alternatively, the synchronising pulse signal can be communicated over a wireless radio link or a wireless Infra Red link, such as signal 1006 or, the synchronising signal may be via an optical cable or a wire cable link such as depicted by wire link signal 1007. With a GPS linked system, a synchronising signal 1004 from the GPS satellites synchronizes the transmit sequence of the metal detector 1001 and the ground loop 1002 together so they both transmit (and equally receive) at the same time. With the radio/Infra Red/optical fiber/wire cable option for signal communication the metal detector 1001 is configured as a timing master and the ground loop 1002 will always be a timing slave. A synchronising pulse signal in the form of a timing signal is sent from the master (metal detector 1001) and is received by the slave (ground loop 1002 or more precisely received by the control device 1003) to synchronize the transmit and/or receive sequence of the metal detector 1001 and the ground loop 1002 together so they both transmit and/or receive at the same time. As would be appreciated by the person skilled in the art, the ground loop coil 1002 generates a much larger magnetic field than the metal detector 1001 can itself so greater depth of detection can be achieved.

While this invention has been described in connection with specific embodiments thereof, it will be understood that it is capable of further modification(s). This application is Intended to cover any variations uses or adaptations of the invention following in general, the principles of the invention and including such departures from the present disclosure as come within known or customary practice within the art to which the invention pertains and as may be applied to the essential features hereinbefore set forth. For example it is envisaged that the means by which master apparatus, for example a master metal detector, provides the synchronising signal in embodiments of the present invention may comprise a phase locked loop amongst other electronic means as understood by the person skilled in the art. Equally, it is envisaged within embodiments of the present invention that the means for slave apparatus, for example either a slave metal detector or a ground loop coil, to capture and respond to a synchronising signal may also comprise a phase locked loop or other electronic means as would be understood by the person skilled in the art.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

We claim:

1. A metal detection system comprising a plurality of independently maneuverable individual metal detectors, each individual metal detector having: a communication interface; and synchronizing means for effecting synchronization amongst respective transmit/receive timing circuits of the plurality of individual metal detectors in accordance with signals conveyed via the communication interface, to avoid interference between the individual metal detectors.

2. A metal detection system as claimed in claim 1 further comprising: synchronizing pulse signal means for generating a synchronizing pulse signal; transmission means for transmitting the synchronizing pulse signal over the communication interface; receiving means for receiving the synchronizing pulse signal conveyed via the communications interface; and resetting means for resetting the timing sequence of at least one of a transmit timing signal and a receive timing signal of each metal detector in accordance with the synchronizing pulse signal.

3. A metal detection system as claimed in claim 2 further comprising a remote communication device adapted to invoke the synchronizing pulse signal means to generate the synchronizing pulse signal and the transmission means to transmit the synchronizing pulse signal over the communication interface.

4. A metal detection system as claimed in claim 3 wherein the remote communication device comprises a GPS satellite.

5. A metal detection system as claimed in claim 4 wherein the synchronizing pulse signal comprises a resultant PPS signal adapted to synchronize to Universal Time and is generated by a GPS receiver in one or each metal detector.

6. A metal detection system as claimed in claim 5 wherein the receiving means is adapted to introduce a steering signal adapted to lock a timing oscillator of one or each metal detector to an exact frequency.

7. A metal detection system as claimed in claim 2 wherein one or more of the plurality of metal detectors is adapted to receive the synchronizing pulse signal by acting as a slave device.

8. A metal detection system as claimed in claim 7 wherein one of the metal detectors, acting as a master device, is adapted to generate and transmit the synchronizing pulse signal.

9. A metal detection system as claimed in claim 1 wherein the communication interface comprises one or a combination of: a satellite communication interface; a radio interface; a wireless Infra Red link; a wire or cable link; an optical fiber link.

10. A metal detection system as claimed in claim 1 wherein one of the plurality of metal detectors comprises a ground loop coil.

11. Apparatus adapted to synchronize a plurality of independently maneuverable and operable metal detectors, said apparatus comprising: processor means adapted to operate in accordance with a predetermined instruction set, said apparatus, in conjunction with said instruction set, being adapted to control the metal detection system as claimed in claim 1.

12. A computer program product comprising: a non-transitory computer readable medium encoded with computer readable instructions having computer readable program code and computer readable system code embodied on said medium for synchronizing at least one first metal detector with at least one independently maneuverable and operable second metal detector within a data processing system, said computer program product comprising: computer readable code within said computer usable medium for controlling the metal detection system as claimed in claim 1.

13. A metal detection system adapted for operating a first metal detector in close proximity with a second metal detector, wherein the first and second metal detectors are independently maneuverable and operable, comprising: synchronizing means for synchronizing a transmit/receive timing circuit of the first metal detector with a transmit/receive timing circuit of the second metal detector to avoid interference between the first and second metal detectors.

14. A metal detection system as claimed in claim 13 wherein the synchronizing means comprises: synchronizing pulse signal means for generating a synchronizing pulse signal; transmitting means for transmitting the synchronizing pulse signal over a communication interface; receiving means for receiving the synchronizing pulse signal at the first metal detector; resetting means for resetting the timing sequence of at least one of a transmit timing signal and a receive timing signal of the first metal detector in accordance with the synchronizing pulse signal.

15. A metal detection system as claimed in claim 14 wherein the communication interface comprises one or a combination of: a satellite communication interface; a radio interface; a wireless Infra Red link; a wire or cable link; an optical fiber link.

16. A metal detection system adapted to increase detection depth, comprising: at least one ground loop coil, and at least one independently maneuverable metal detector; and synchronizing means for synchronizing a transmit/receive timing circuit of the at least one metal detector with a transmit/receive timing circuit of the at least one ground loop coil.

17. A metal detection system as claimed in claim 16 wherein the synchronizing means comprises: synchronizing pulse signal means for generating a synchronizing pulse signal; transmitting means for transmitting the synchronizing pulse signal over a communication interface; receiving means for receiving the synchronizing pulse signal at a control device of the ground loop coil; resetting means for resetting the timing sequence of at least one of a transmit timing signal and a receive timing signal of the ground loop coil in accordance with the synchronizing pulse signal.

* * * * *